United States Patent
Chen et al.

(10) Patent No.: US 8,400,421 B2
(45) Date of Patent: Mar. 19, 2013

(54) TOUCH PANEL AND MULTI-TOUCH DETECTING METHOD THEREOF

(75) Inventors: Po-Yang Chen, Miao-Li County (TW); Po-Sheng Shih, Miao-Li County (TW); Chih-Han Chao, Miao-Li County (TW); Chien-Yung Cheng, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 457 days.

(21) Appl. No.: 12/825,347

(22) Filed: Jun. 29, 2010

(65) Prior Publication Data

US 2011/0005844 A1    Jan. 13, 2011

(51) Int. Cl.
*G09G 3/30* (2006.01)

(52) U.S. Cl. ........................................ 345/174; 345/173

(58) Field of Classification Search ........................ None
See application file for complete search history.

(56) References Cited

U.S. PATENT DOCUMENTS

| | | | |
|---|---|---|---|
| 2003/0098858 A1 | 5/2003 | Perski et al. | |
| 2005/0209392 A1 | 9/2005 | Luo et al. | |
| 2009/0160795 A1 | 6/2009 | Jiang et al. | |
| 2009/0160798 A1 | 6/2009 | Jiang et al. | |
| 2010/0144391 A1* | 6/2010 | Chang et al. | 455/566 |
| 2011/0248932 A1* | 10/2011 | Wu et al. | 345/173 |

FOREIGN PATENT DOCUMENTS

| | | |
|---|---|---|
| CN | 101464765 A | 6/2009 |
| EP | 2073109 A2 | 6/2009 |

* cited by examiner

*Primary Examiner* — Joseph Haley
(74) *Attorney, Agent, or Firm* — WPAT PC; Justin King

(57) ABSTRACT

A multi-touch detecting method is adapted for detecting locations of touched points on a touch panel including first and second conductive films, and includes following steps. First measuring points of the first conductive film distributed along X-axis of a Cartesian plane are scanned, and x-components are determined accordingly. Second measuring points of the second conductive film distributed along Y-axis of the Cartesian plane are scanned, and y-components are determined accordingly. A first voltage is applied to the first conductive film, and A second voltage is applied to at least one of the second measuring points with the location on the Y-axis adjacent to or overlapping one of the y-components. Voltages at the first measuring points with the locations on the X-axis adjacent to or overlapping the x-components are measured sequentially and one of the y-components and one of the x-components are outputted.

15 Claims, 11 Drawing Sheets

TOUCH PANEL AND MULTI-TOUCH DETECTING METHOD THEREOF

BACKGROUND

1. Technical Field

The present disclosure relates to a touch panel and a multi-touch detecting method thereof, and more particularly to a touch panel that uses at least one conductive film exhibiting electric anisotropy and a multi-touch detecting method thereof.

2. Description of Related Art

Touch panels are becoming widely used in electronic products, such as mobile phones and navigation systems, for example, to serve as input devices. A new trend of the touch panel technology is towards having a multi-touch detection ability. There are several types of touch panels including resistive type, capacitive type, infrared type, and surface acoustic wave type, for example. Conventional resistive type touch panels do not support multi-touch detection. When multiple points on a resistive type touch panel are touched, the location of the touched points cannot be correctly determined. Conventional capacitive type touch panels, such as those disclosed in U.S. Patent Publication Nos. 2006/0097991 and 2008/0158181, can support multi-touch detection. However, a capacitive type touch panel requires several photolithographic steps in a manufacturing process, and the detecting method for determining the locations of multiple touched points on a capacitive type touch panel is complicated.

SUMMARY OF THE DISCLOSURE

According to the first aspect of this disclosure, there is provided a touch panel that includes a first substrate, a second substrate, a first conductive film disposed on the first substrate, and a second conductive film disposed on the second substrate and juxtaposed with the first conductive film in a face-to-face manner. The first conductive film exhibits electric anisotropy and has a lower resistivity in a first direction than that in a second direction transverse to the first direction. The second conductive film exhibits electric anisotropy and has a lower resistivity in the second direction than that in the first direction.

According to the second aspect of this disclosure, there is provided a multi-touch detecting method adapted for detecting locations of touched points on a touch panel. The touch panel includes first and second conductive films insulated from each other and coupled electrically to each other through touch. The multi-touch detecting method includes the following steps. First measuring points of the first conductive film distributed along X-axis of a Cartesian plane are scanned, and x-components are determined based on the response of the first measuring points. Second measuring points of the second conductive film distributed along Y-axis of the Cartesian plane are scanned, and y-components of the touched points are determined based on the response of the second measuring points. A first voltage is applied to the first conductive film. A second voltage different from the first voltage is applied to at least one of the second measuring points with the location on the Y-axis adjacent to or overlapping one of the y-components. Voltages at the first measuring points with the locations on the X-axis adjacent to or overlapping the x-components, in response to the application of the second voltage, are measured sequentially. The one of the y-components and one of the x-components are outputted, which corresponds to one of the first measuring points at which a local extreme voltage is measured, as the location of a corresponding one of the touched points.

According to the third aspect of this disclosure, there is provided a multi-touch detecting method adapted for detecting locations of touched points on a touch panel. The touch panel includes first and second conductive films insulated from each other and coupled electrically to each other through touch. The multi-touch detecting method includes the following steps. The step (a) is the step of scanning first measuring points of the first conductive film distributed along X-axis of a Cartesian plane, and determining x-components, which correspond to the locations of the touched points, based on the response of the first measuring points. The step (b) is the step of scanning second measuring points of the second conductive film distributed along Y-axis of the Cartesian plane, and determining y-components of the touched points, based on the response of the second measuring points. The step (c) is the step of applying a first voltage to the first conductive film. The step (d) is step of applying a second voltage different from the first voltage to at least one of the second measuring points with the location on the Y-axis adjacent to or overlapping one of the y-components, and measuring sequentially voltages at the first measuring points with the locations on the X-axis adjacent to or overlapping the x-components, in response to the application of the second voltage. The step (e) is the step of simultaneously applying the second voltage to the at least one of the second measuring points with the location on the Y-axis adjacent to or overlapping the one of the y-components in step (d), and to at least one of the second measuring points with the location on the Y-axis adjacent to or overlapping another one of the y-components, and measuring sequentially voltages at the first measuring points with the locations on the X-axis adjacent to or overlapping the x-components, in response to the application of the second voltage. The step (f) is the step of outputting the one of the y-components and one of the x-components, which corresponds to one of the first measuring points at which a local extreme voltage is measured in step (e), as the location of a corresponding one of the touched points when the voltages measured at the one of the first measuring points in steps (d) and (e) are different.

According to the fourth aspect of this disclosure, there is provided a multi-touch detecting method adapted for detecting locations of touched points on a touch panel. The touch panel includes first and second conductive films insulated from each other and coupled electrically to each other through a user's touch. The first conductive film has a plurality of first measuring points distributed along X-axis of a Cartesian plane. The second conductive film has a plurality of second measuring points distributed along Y-axis of the Cartesian plane. The multi-touch detecting method includes the following steps. A first voltage is applied to the first conductive film. A second voltage different from the first voltage is applied to one of the second measuring points. Voltages at the first measuring points in response to the application of the second voltage are measured sequentially. A location based on the one of the second measuring points and one of the first measuring points at which a local extreme voltage is measured are outputted.

According to the fifth aspect of this disclosure, there is provided a multi-touch detecting method adapted for detecting locations of touched points on a touch panel. The touch panel includes first and second conductive films insulated from each other and coupled electrically to each other through touch. The first conductive film has a plurality of first measuring points distributed along X-axis of a Cartesian plane. The second conductive film has a plurality of second measuring points distributed along Y-axis of the Cartesian plane. The multi-touch detecting method includes the following steps. The step (a) is the step of applying a first voltage to the first conductive film. The step (b) is the step of applying a second voltage different from the first voltage to one of the second measuring points, and measuring sequentially voltages at the first measuring points in response to the application of the second voltage. The step (c) is the step of simultaneously applying the second voltage to the one of the second measuring points in step (b) and to another one of the second measuring points, and measuring sequentially voltages at the first measuring points in response to the application of the second voltage. The step (d) is the step of outputting a location based on the another one of the second measuring points and one of the first measuring points at which a local extreme voltage is measured in step (c) when the voltages measured at the one of the first measuring points in steps (b) and (c) are different.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various embodiments in detail.

Figure 1:
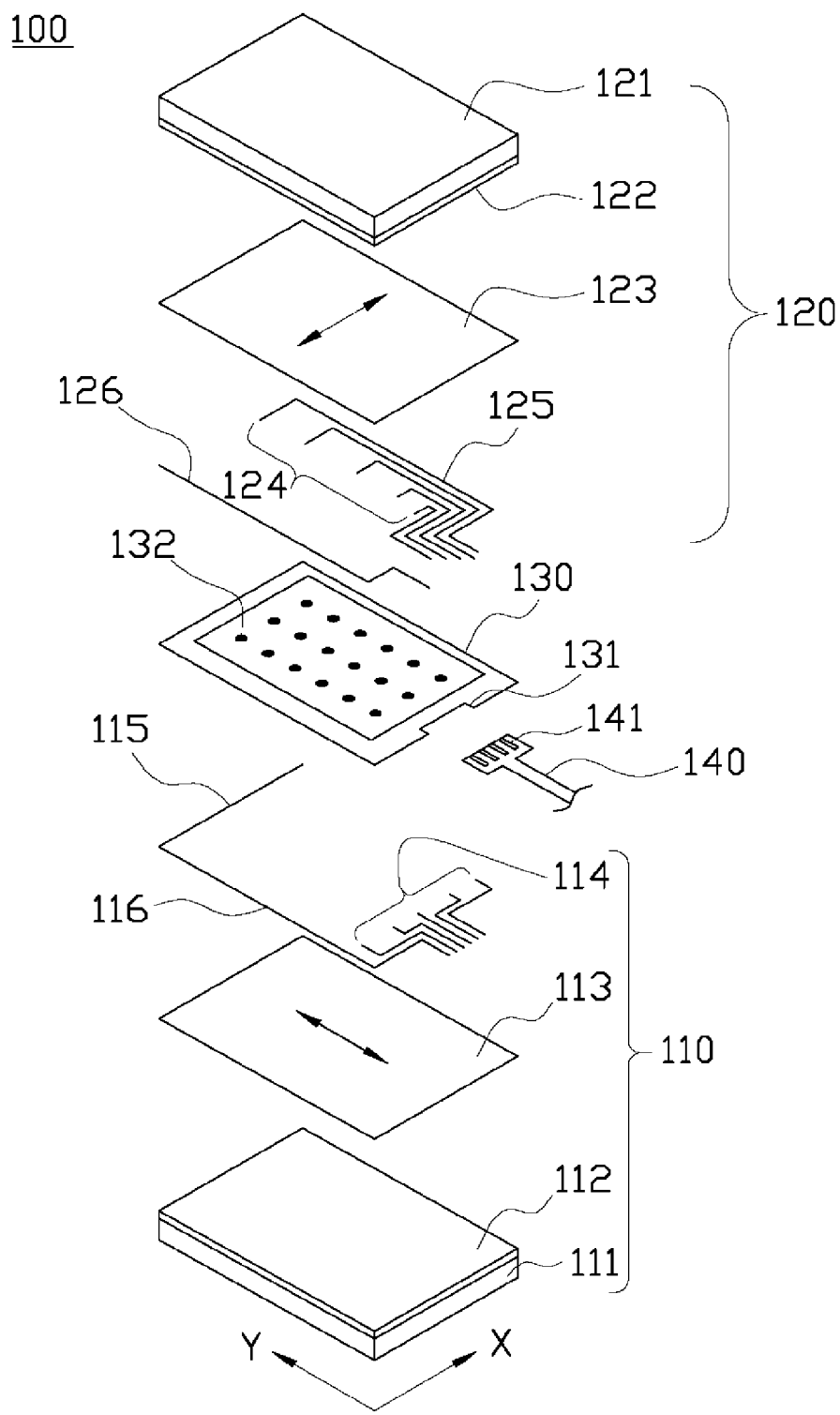
FIG. 1 is an exploded perspective view of the exemplary embodiment of a touch panel of the present disclosure.

Referring to FIG. 1, the exemplary embodiment of a touch panel 100 of the present disclosure includes a first layer 110, a second layer 120, an adhesive film 130, a plurality of spacers 132 of an insulator, and a flexible print circuit (FPC) 140. The adhesive film 130 extends along sides of the first and second layers 110, 120, and bonds the first and second layers 110, 120 together. The adhesive film 130 is formed with a recess 131 that fittingly receives the flexible print circuit 140. The spacers 132 are disposed between the first and second layers 110, 120, and serve to separate and thus insulate the first and second layers 110, 120.

The first layer 110 includes a first substrate 111, a first conductive film 113, an adhesive film 112, a first electrode 115, a plurality of second electrodes 114, and a plurality of conductive lines 116. The first conductive film 113 is disposed on the first substrate 111, and is bonded to the first substrate 111 through the adhesive film 112. The first conductive film 113 exhibits electric anisotropy, has a lower resistivity in a first direction (Y) than that in a second direction (X), i.e., Y-axis of a Cartesian plane, and further has two sides (not labeled) opposite to each other in the first direction (Y). The first electrode 115 is disposed at one of the sides of the first conductive film 113, and is coupled electrically to the aforesaid one of the sides of the first conductive film 113. The second electrodes 114, such as sensing electrodes, are uniformly disposed along the other side of the first conductive film 113, and are coupled electrically to different first measuring points of the other side of the first conductive film 113 distributed along the second direction (X), i.e., X-axis of the Cartesian plane, transverse to the first direction (Y). The conductive lines 116 extend respectively from the first and second electrodes 115, 114 towards one of the sides of the first layer 110 at which the recess 131 of the adhesive film 130 is formed. It is noted that the number of the second electrodes 114 employed in the exemplary embodiment shown in FIG. 1 is illustrative only and can be adjusted according to actual requirements.

The second layer 120 includes a second substrate 121, a second conductive film 123, an adhesive film 122, a third electrode 126, a plurality of fourth electrodes 124, and a plurality of conductive lines 125. The second conductive film 123 is disposed on the second substrate 121, is bonded to the second substrate 121 through the adhesive film 122, and is juxtaposed with the first conductive film 113 in a face-to-face manner The second conductive film 123 exhibits electric anisotropy, has a lower resistivity in the second direction (X) than that in the first direction (Y), and further has two sides (not labeled) opposite to each other in the second direction (X). The third electrode 126 is disposed at one of the sides of the second conductive film 123, and is coupled electrically to the aforesaid one of the sides of the second conductive film 123. The fourth electrodes 124, such as sensing electrodes, are uniformly disposed along the other side of the second conductive film 123, and are coupled electrically to different second measuring points of the other side of the second conductive film 123 distributed along the first direction (Y). The conductive lines 125 extend respectively from the third and fourth electrodes 126, 124 towards one of the sides of the second layer 120 at which the recess 131 of the adhesive film 130 is formed. It is noted that the number of the fourth electrodes 124 employed in the exemplary embodiment shown in FIG. 1 is illustrative only and can be adjusted according to actual requirements.

The flexible print circuit 140 is provided with a plurality of metal pads 141 coupled electrically to the conductive lines 116, 125, respectively, and serves to transmit electric signals from an external source (not shown) through the conductive lines 116, 125 to the first, second, third, and fourth electrodes 115, 114, 126, 124 and vice versa.

Each of the first and second substrates 111, 121 can be made from a transparent material, such as polyethylene (PE), polycarbonate (PC), polyethylene terephthalate (PET), polymethyl methacrylate (PMMA), or glass. Each of the adhesive films 130, 112, 122, can be made from a thermal-cured adhesive or a UV-cured adhesive.

In this embodiment, each of the first and second conductive films 113, 123 can be manufactured by a method disclosed in Taiwanese Patent Publication No. 200920689. The first conductive film 113 can be made from a nanomaterial that has strings of interconnected carbon nanounits with each string substantially extending in the first direction (Y). The structure of the first conductive film 113 permits the first conductive film 113 to have the lower resistivity in the first direction (Y) and a higher resistivity in the second direction (X) which is about 50 to 350 times greater than the lower resistivity in the first direction (Y). In other words, the first conductive film 113 has an electric anisotropy ratio ranging from about 50 to 350. The second conductive film 123 can be made from a nanomaterial that has strings of interconnected carbon nanounits with each string substantially extending in the second direction (X). The structure of the second conductive film 123 permits the second conductive film 123 to have the lower resistivity in the second direction (X) and a higher resistivity in the first direction (Y) which is about 50 to 350 times greater than the lower resistivity in the second direction (X). In other words, the second conductive film 123 has an electric anisotropy ratio ranging from about 50 to 350. Each of the first and second conductive films 113, 123 has a surface resistivity ranging from about 1 kΩ/□ to 800 kΩ/□. Preferably, each of the first and second conductive films 113, 123 has an electric anisotropy ratio ranging from about 100 to 200.

The first exemplary embodiment of a multi-touch detecting method of the present disclosure is adapted for detecting locations of touched points, such as the points touched by a user, on the touch panel 100, and includes the following steps. The first measuring points of the first conductive film 113 are scanned through the second electrodes 114, and x-components of the touched points are determined based on the response of the first measuring points. The second measuring points of the second conductive film 123 are scanned through the fourth electrodes 124, and y-components of the touched points, are determined based on the response of the second measuring points. A first voltage is applied to the sides of the first conductive film 113 through the first and second electrodes 115, 114, respectively, and a second voltage different from the first voltage is applied to at least one of the second measuring points with the location on the Y-axis adjacent to or overlapping one of the y-components through the corresponding fourth electrode 124. Voltages at the first measuring points with the locations on the X-axis adjacent to or overlapping the x-components are measured sequentially through the corresponding second electrodes 114, in response to the application of the second voltage. The aforesaid one of the y-components and one of the x-components corresponding to one of the first measuring points at which a local extreme voltage is measured are outputted, as the location of a corresponding one of the touched points.

In this embodiment, the step of scanning the first measuring points and determining x-components includes the sub-steps of: applying the first voltage to the sides of the first conductive film 113 through the first and second electrodes 115, 114, respectively; applying the second voltage greater than the first voltage to the sides of the second conductive film 123 through the third and fourth electrodes 126, 124, respectively; measuring sequentially voltages at the first measuring points through the second electrodes 114 in response to the application of the second voltage to the sides of the second conductive film 123; obtaining local maximal voltages and local minimal voltage(s) among the local maximal voltages from the voltages measured at the first measuring points; and determining the x-components based on the locations of the first measuring points corresponding to the local maximal voltages on the X-axis, respectively. In addition, the step of scanning the second measuring points and determining y-components includes the following sub-steps. Measuring sequentially voltages at the second measuring points through the fourth electrodes 124 in response to the application of the first voltage to the sides of the first conductive film 113; obtaining local minimal voltages and local maximal voltage(s) among the local maximal voltages from the voltages measured at the second measuring points; and determining the y-components based on the locations of the second measuring points corresponding to the local minimal voltages on the Y-axis, respectively.

Preferably, in the measuring sub-steps, the voltages are measured in such a manner that while each of measuring points is measured, the first voltage is applied to the rest of the first measuring points and the second voltage is applied to the rest of the second measuring points, in order to eliminate an adverse effect on the measuring point being measured caused by the rest of the measuring points and to improve the accuracy of the measured voltage at the measuring point being measured.

When the touch panel 100 is not touched, the first and second conductive films 113, 123 are insulated from each other, and the voltages measured at the second electrodes 114 are all equal to the first voltage, whereas the voltages measured at the fourth electrodes 124 are all equal to the second voltage. As an example, when two points on the touch panel 100 are touched, the first and second conductive films 113, 123 are coupled electrically to each other at the touched points, and the voltages at the corresponding second electrodes 114 corresponding to the touched points rise above the first voltage (see FIGS. 2 and 3), whereas the voltages at the corresponding fourth electrodes 124 corresponding to the touched points drop below the second voltage (see FIGS. 4 and 5).

When the two touched points are not close to each other, the response of the voltages at the corresponding second electrodes 114 and the corresponding fourth electrodes 124 corresponding to the two selected points on the touch panel 100 follows a pattern different from that of the voltages at the corresponding second electrodes 114 and the corresponding fourth electrodes 124 when the two touched points are close to each other. Hence, determination of the x-components or the y-components will be based on one set of equations when the touched points are distant from each other or on a different set of equations when the touched points are close to each other, and will be described in detail as follows.

Figure 2:
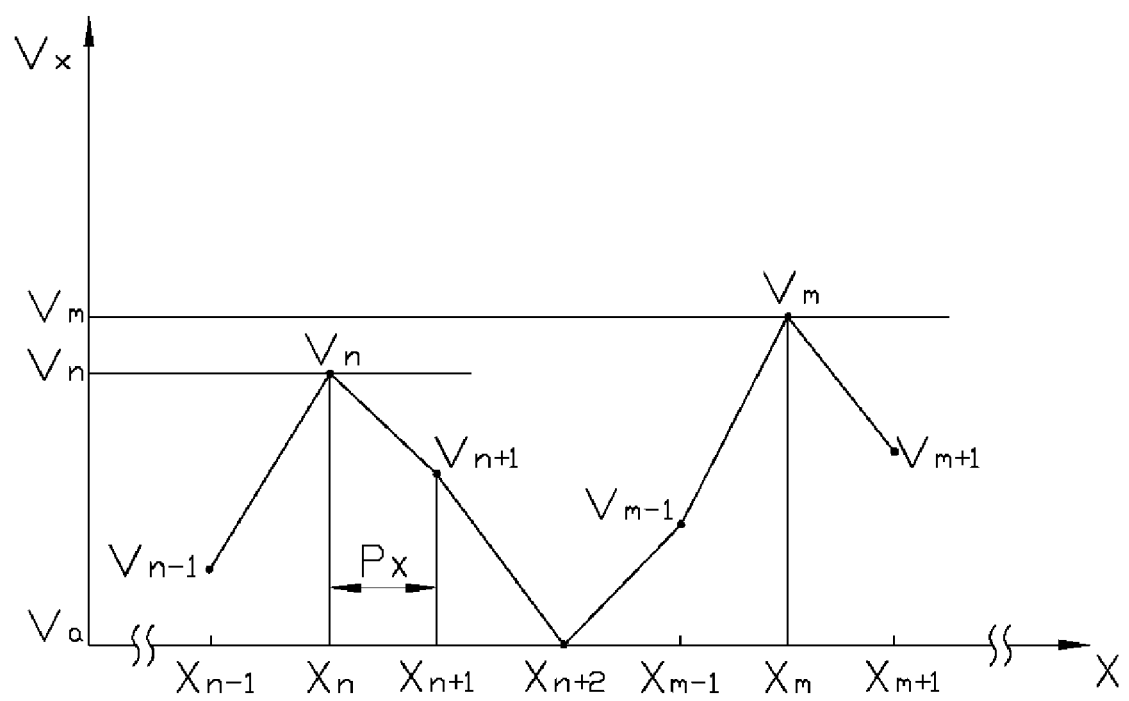
FIG. 2 is a plot of voltages measured at measuring points of a first conductive film of the touch panel along a direction in response to a two-point touch in which two points on the touch panel are touched and are distant from each other in the direction.

Referring to FIG. 2, in combination with FIG. 1, assume, in response to the two touched points on the touch panel 100, that a first local maximal voltage $V_n$ is measured at the $n^{th}$ one of the first measuring points, that a second local maximal voltage $V_m$ is measured at the $m^{th}$ one of the first measuring points, and that $n \geq 2$, and $m \geq n+3$, which represents that the touched points are distant from each other on the X-axis. A first x-component $X_a$ corresponding to the location of a first one of the touched points is determined by one of the following equations according to a respective one of the following conditions:

if $V_{n-1} < V_{n+1}$, then $X_a = X_n + \frac{P_x}{2} \times \frac{V_{n+1} - V_{n-1}}{V_n - V_{n-1}}$;

if $V_{n-1} = V_{n+1}$, then $X_a = X_n$; and if $V_{n-1} > V_{n+1}$, then $X_a = X_n + \frac{P_x}{2} \times \frac{V_{n+1} - V_{n-1}}{V_n - V_{n+1}}$;

where $V_{n-1}$ is the voltage measured at the n–1$^{th}$ one of the first measuring points, $V_{n+1}$ is the voltage measured at the n+1$^{th}$ one of the first measuring points, $X_n$ is the location of the n$^{th}$ one of the first measuring points on the X-axis, and $P_x$ is a distance between two adjacent ones of the first measuring points.

In addition, a second x-component $X_b$ corresponding to the location of a second one of the touched points is determined by one of the following equations according to a respective one of the following conditions:

if $V_{m-1} < V_{m+1}$, then $X_b = X_m + \frac{P_x}{2} \times \frac{V_{m+1} - V_{m-1}}{V_m - V_{m-1}}$;

if $V_{m-1} = V_{m+1}$, then $X_b = X_m$; and if $V_{m-1} > V_{m+1}$, then $X_b = X_m + \frac{P_x}{2} \times \frac{V_{m+1} - V_{m-1}}{V_m - V_{m+1}}$;

where $V_{m-1}$ is the voltage measured at the m–1$^{th}$ one of the first measuring points, $V_{m+1}$ is the voltage measured at the m+1$^{th}$ one of the first measuring points, and $X_m$ is the location of the m$^{th}$ one of the first measuring points on the X-axis.

Figure 3:
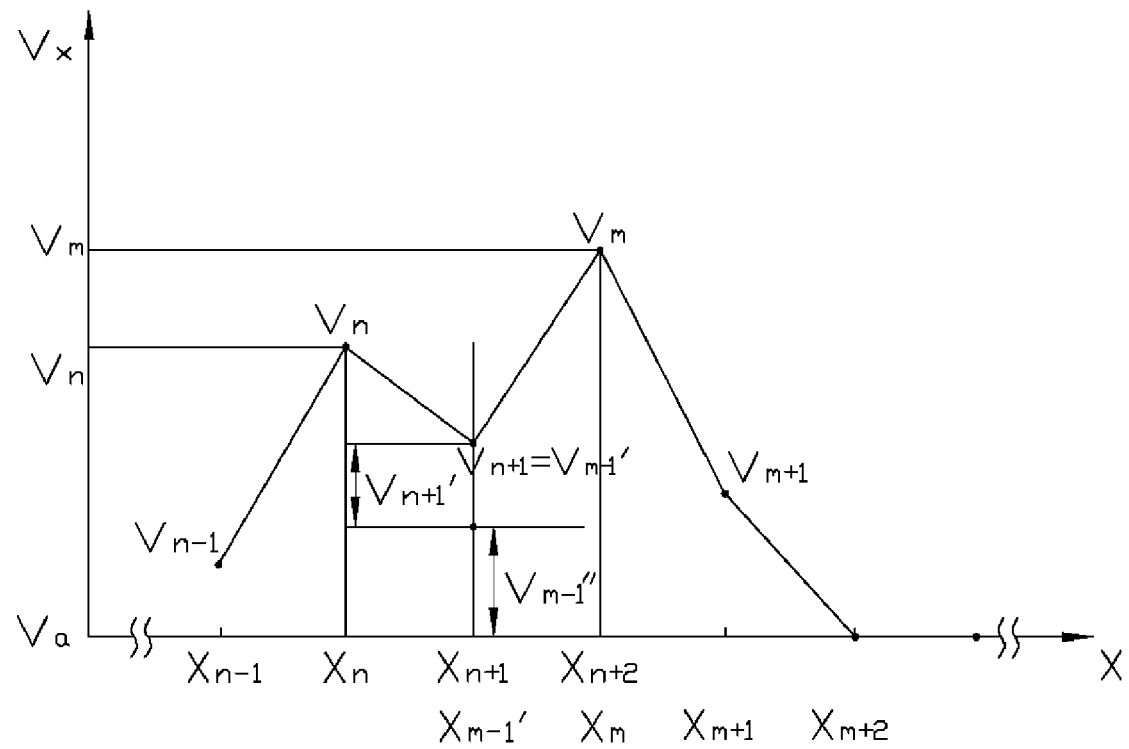
FIG. 3 is a plot of voltages measured at measuring points of the first conductive film of the touch panel along a direction in response to a two-point touch in which two points on the touch panel are touched and are close to each other in the direction.

Referring to FIG. 3, in combination with FIG. 1, assume, in response to the two touched points on the touch panel 100, that is m=n+2, which represents that the touched points are close to each other on the X-axis, and that a local minimal voltage $V_{n+1}$ (=$V_{m-1}$) is measured at the n+1$^{th}$, i.e., m–1$^{th}$, one of the first measuring points, and can be separated into $V_{n+1}'$ and $V_{m-1}''$ as functions of ($V_a$, $V_{n-1}$, $V_n$, $V_{n+1}$, $V_m$, $V_{m+1}$) defined below. A first x-component X, and a second x-component $X_b$ corresponding respectively to the locations of the two touched points are determined by the following equations according to respective ones of the following conditions, respectively:

$$V_{n+1}' = (V_{n+1} - V_a) \times \frac{(V_n - V_a) \times (V_n - V_{n-1})}{(V_n - V_a) \times (V_n - V_{n-1}) + (V_m - V_a) \times (V_m - V_{m+1})} + V_a;$$

$$V_{m-1}'' = (V_{n+1} - V_a) \times \frac{(V_m - V_a) \times (V_m - V_{m+1})}{(V_n - V_a) \times (V_n - V_{n-1}) + (V_m - V_a) \times (V_m - V_{m+1})} + V_a;$$

if $V_{n-1} < V_{n+1}'$, then $X_a = X_n + \frac{P_x}{2} \times \frac{V_{n+1}' - V_{n-1}}{V_n - V_{n-1}}$;

if $V_{n-1} = V_{n+1}'$, then $X_a = X_n$;

if $V_{n-1} > V_{n+1}'$, then $X_a = X_n + \frac{P_x}{2} \times \frac{V_{n+1}' - V_{n-1}}{V_n - V_{n+1}'}$;

if $V_{m-1}'' < V_{m+1}$, then $X_b = X_m + \frac{P_x}{2} \times \frac{V_{m+1} - V_{m-1}''}{V_m - V_{m-1}''}$;

if $V_{m-1}'' = V_{m+1}$, then $X_b = X_m$; and if $V_{m-1}'' > V_{m+1}$, then $X_b = X_m + \frac{P_x}{2} \times \frac{V_{m+1} - V_{m-1}''}{V_m - V_{m+1}}$;

where $V_a$ is the first voltage.

Figure 4:
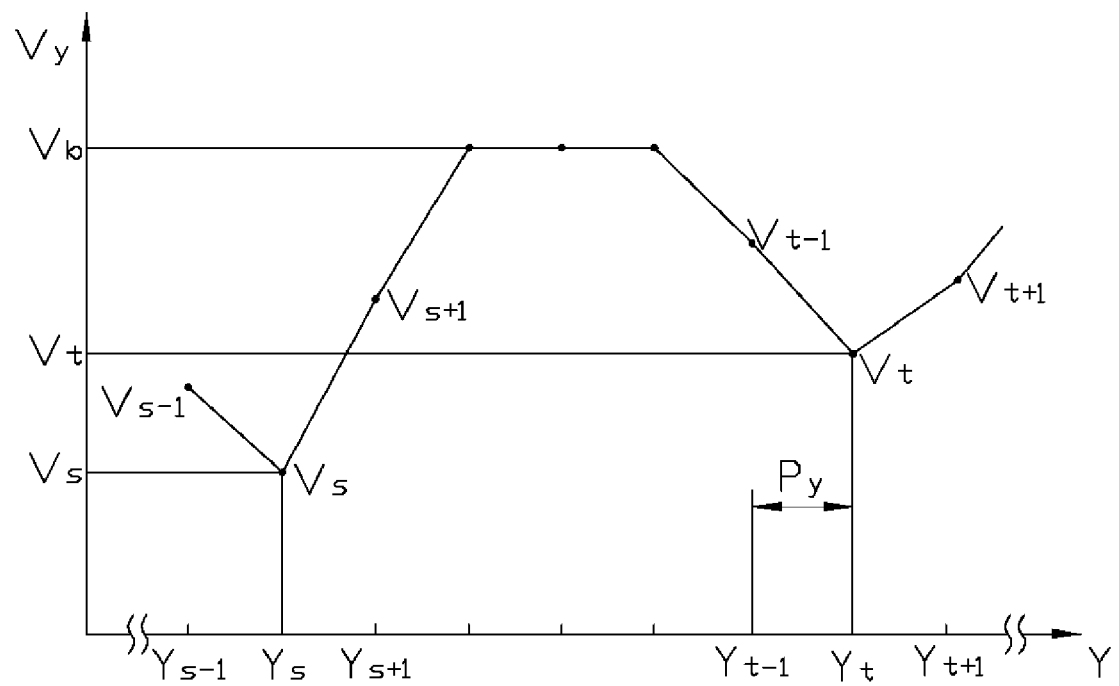
FIG. 4 is a plot of voltages measured at measuring points of a second conductive film of the touch panel along a direction in response to a two-point touch in which the two points on the touch panel are touched and are distant from each other in the direction.

Similarly, referring to FIG. 4, in combination with FIG. 1, assume, in response to the two touched points on the touch panel 100, that a first local minimal voltage $V_s$ is measured at the s$^{th}$ one of the second measuring points, that a second local minimal voltage $V_t$ is measured at the t$^{th}$ one of the second measuring points, and that s≧2, and t≧s+3, which represents that the touched points are distant from each other on the Y-axis. A first y-component $Y_a$ corresponding to the location of the first one of the touched points is determined by one of the following equations according to a respective one of the following conditions:

if $V_{s-1} < V_{s+1}$, then $Y_a = Y_s + \frac{P_y}{2} \times \frac{V_{s-1} - V_{s+1}}{V_{s+1} - V_s}$;

if $V_{s-1} = V_{s+1}$, then $Y_a = Y_s$; and if $V_{s-1} > V_{s+1}$, then $Y_a = Y_s + \frac{P_y}{2} \times \frac{V_{s-1} - V_{s+1}}{V_{s-1} - V_s}$;

where $V_{s-1}$ is the voltage measured at the s–1$^{th}$ one of the second measuring points, $V_{s+1}$ is the voltage measured at the s+1$^{th}$ one of the second measuring points, $Y_s$ is the location of the s$^{th}$ one of the second measuring points on the Y-axis, and $P_y$ is a distance between two adjacent ones of the second measuring points.

In addition, a second y-component $Y_b$ corresponding to the location of the second one of the touched points is determined by one of the following equations according to a respective one of the following conditions:

if $V_{t-1} < V_{t+1}$, then $Y_b = Y_t + \frac{P_y}{2} \times \frac{V_{t-1} - V_{t+1}}{V_{t+1} - V_t}$;

if $V_{t-1} = V_{t+1}$, then $Y_b = Y_t$; and if $V_{t-1} > V_{t+1}$, then $Y_b = Y_t + \frac{P_y}{2} \times \frac{V_{t-1} - V_{t+1}}{V_{t-1} - V_t}$;

where $V_{t-1}$ is the voltage measured at the t–1$^{th}$ one of the second measuring points, $V_{t+1}$ is the voltage measured at the t+1$^{th}$ one of the second measuring points, and $Y_t$ is the location of the t$^{th}$ one of the second measuring points on the Y-axis.

Figure 5:
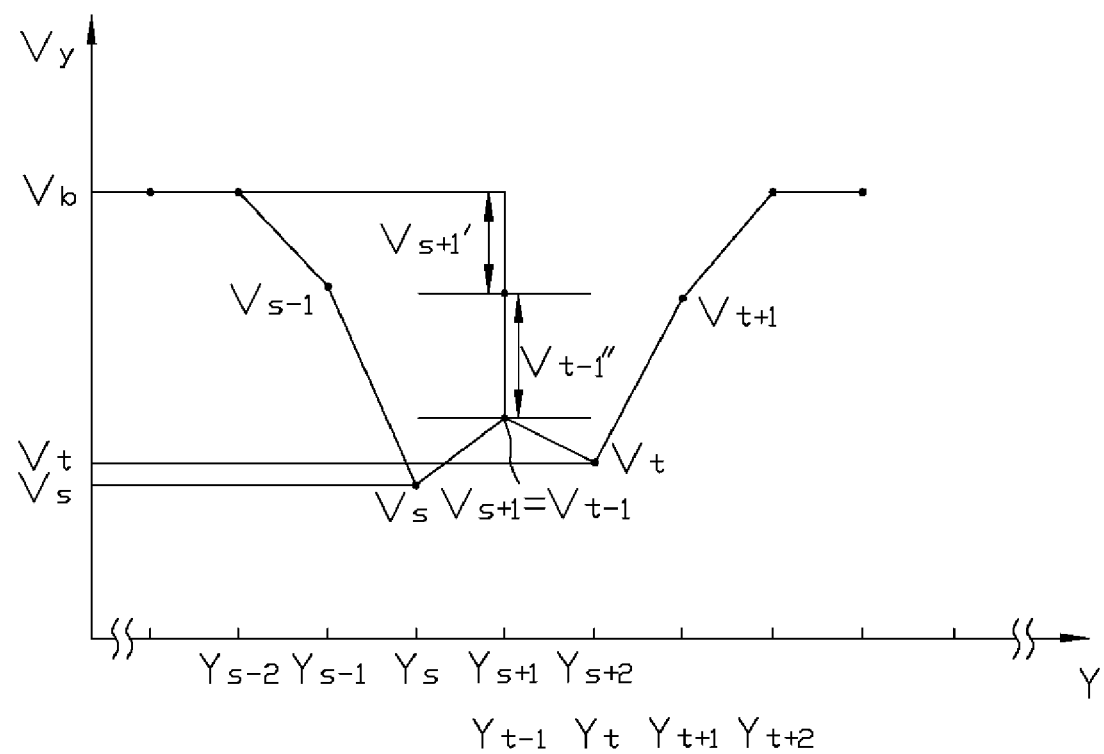
FIG. 5 is a plot of voltages measured at measuring points of the second conductive film of the touch panel along a direction in response to a two-point touch in which two points on the touch panel are touched and are close to each other in the direction.

Referring to FIG. 5, in combination with FIG. 1, assume, in response to the two touched points on the touch panel 100, that t=s+2, which represents that the touched points are close to each other on the Y-axis, and that a local maximal voltage $V_{s+1}$ (=$V_{t-1}$) is measured at the s+1$^{th}$, i.e., t–1$^{th}$, one of the second measuring points, and can be separated into $V_{s+1}'$ and $V_{t-1}''$ as functions of ($V_b$, $V_{s-1}$, $V_s$, $V_{s+1}$, $V_t$, $V_{t+1}$) defined below. A first y-component $Y_a$ and a second y-component $Y_b$ corresponding respectively to the locations of the touched points are determined by the following equations according to respective ones of the following conditions, respectively:

$$V_{s+1}' = V_b(V_b - V_{s+1}) \times \frac{(V_b - V_s) \times (V_{s-1} - V_s)}{(V_b - V_s) \times (V_{s-1} - V_s) + (V_b - V_t) \times (V_{t+1} - V_t)};$$

$$V_{t-1}'' = V_b - (V_b - V_{s+1}) \times \frac{(V_b - V_t) \times (V_{t+1} - V_t)}{(V_b - V_s) \times (V_{s-1} - V_s) + (V_b - V_t) \times (V_{t+1} - V_t)};$$

-continued if $V_{s-1} < V'_{s+1}$, then $Y_a = Y_s + \frac{P_y}{2} \times \frac{V_{s-1} - V'_{s+1}}{V'_{s+1} - V_s}$;

if $V_{s-1} = V'_{s+1}$, then $Y_a = Y_s$;

if $V_{s-1} > V'_{s+1}$, then $Y_a = Y_s + \frac{P_y}{2} \times \frac{V_{s-1} - V'_{s+1}}{V_{s-1} - V_s}$;

if $V''_{t-1} < V_{t+1}$, then $Y_b = Y_t + \frac{P_y}{2} \times \frac{V''_{t-1} - V_{t+1}}{V_{t+1} - V_t}$;

if $V''_{t-1} = V_{t+1}$, then $Y_b = Y_t$; and if $V''_{t-1} > V_{t+1}$, then $Y_b = Y_t + \frac{P_y}{2} \times \frac{V''_{t-1} - V_{t+1}}{V''_{t-1} - V_t}$;

where $V_b$ is the second voltage.

Although the x-components and the y-components corresponding to the locations of the touched points are determined, the exact pairs of the x-components and the y-components corresponding to the locations of the touched points are yet to be determined. The following describes how the exact pairs of the x-components and the y-components are determined Referring to FIG. 6, in combination with FIG. 1, assume the following conditions. Five touched points ($C_{11}$, $C_{21}$, $C_{23}$, $C_{31}$, $C_{32}$) on the touch panel 100 are touched. The touched points ($C_{11}$, $C_{21}$, $C_{31}$) are aligned in the first direction (Y). The touched points ($C_{21}$, $C_{23}$) are aligned in the second direction (X). The touched points ($C_{31}$, $C_{32}$) are aligned in the second direction (X). There are eight first measuring points with the locations on the X-axis of $X_{m-3} \sim X_{m+4}$, respectively. There are eight second measuring points with the locations on the Y-axis of $Y_{n-3} \sim Y_{n+4}$, respectively; that the x-components are determined to be $x_1$, $x_2$, and $x_3$. The y-components are determined to be $y_1$, $y_2$, and $y_3$. The x-components $x_1$, $x_2$, $x_3$ and the y-components $y_1$, $y_2$, $y_3$ can be paired into nine locations including the locations of the touched points ($C_{11}$, $C_{21}$, $C_{23}$, $C_{31}$, $C_{32}$) and the locations of false points ($C_{12}$, $C_{13}$, $C_{22}$, $C_{33}$). The following describes how the false points ($C_{12}$, $C_{13}$, $C_{22}$, $C_{33}$) are determined based on the voltages measured at the first measuring points in response to the application of the second voltage.

According to the obtained x-components $x_1$, $x_2$, $x_3$ and the y-components $y_1$, $y_2$, $y_3$, three first regions ($S_1$, $S_2$, $S_3$) on the first conductive film 113 corresponding respectively to the x-components $x_1$, $x_2$, $x_3$ can be found, and three second regions ($D_1$, $D_2$, $D_3$) on the second conductive film 123 corresponding respectively to the y-components $y_1$, $y_2$, $y_3$ can be found. The first one of the first regions ($S_1$) corresponds to two of the first measuring points with the locations on the X-axis, i.e., $X_{m-3}$ and $X_{m-2}$, adjacent to a first one of the x-components $x_1$. The second one of the first regions ($S_2$) corresponds to two of the first measuring points with the locations on the X-axis, i.e., $X_{m-1}$ and $X_m$, adjacent to a second one of the x-components $x_2$. The third one of the first regions ($S_3$) corresponds to one of the first measuring points with the location on the X-axis, i.e., $X_{m+3}$, overlapping a third one of the x-components $x_3$. The first one of the second regions ($D_1$) corresponds to one of the second measuring points with the location on the Y-axis, i.e., $Y_{n-3}$, overlapping a first one of the y-components $y_1$. The second one of the second regions ($D_2$) corresponds to two of the second measuring points with the locations on the Y-axis, i.e., $Y_{n-1}$ and $Y_n$, adjacent to a second one of the y-components $y_2$. The third one of the second regions ($D_3$) corresponds to two of the second measuring points with the locations on the Y-axis, i.e., $Y_{n+2}$ and $Y_{n+3}$, adjacent to a third one of the y-components $y_3$.

Figure 7:
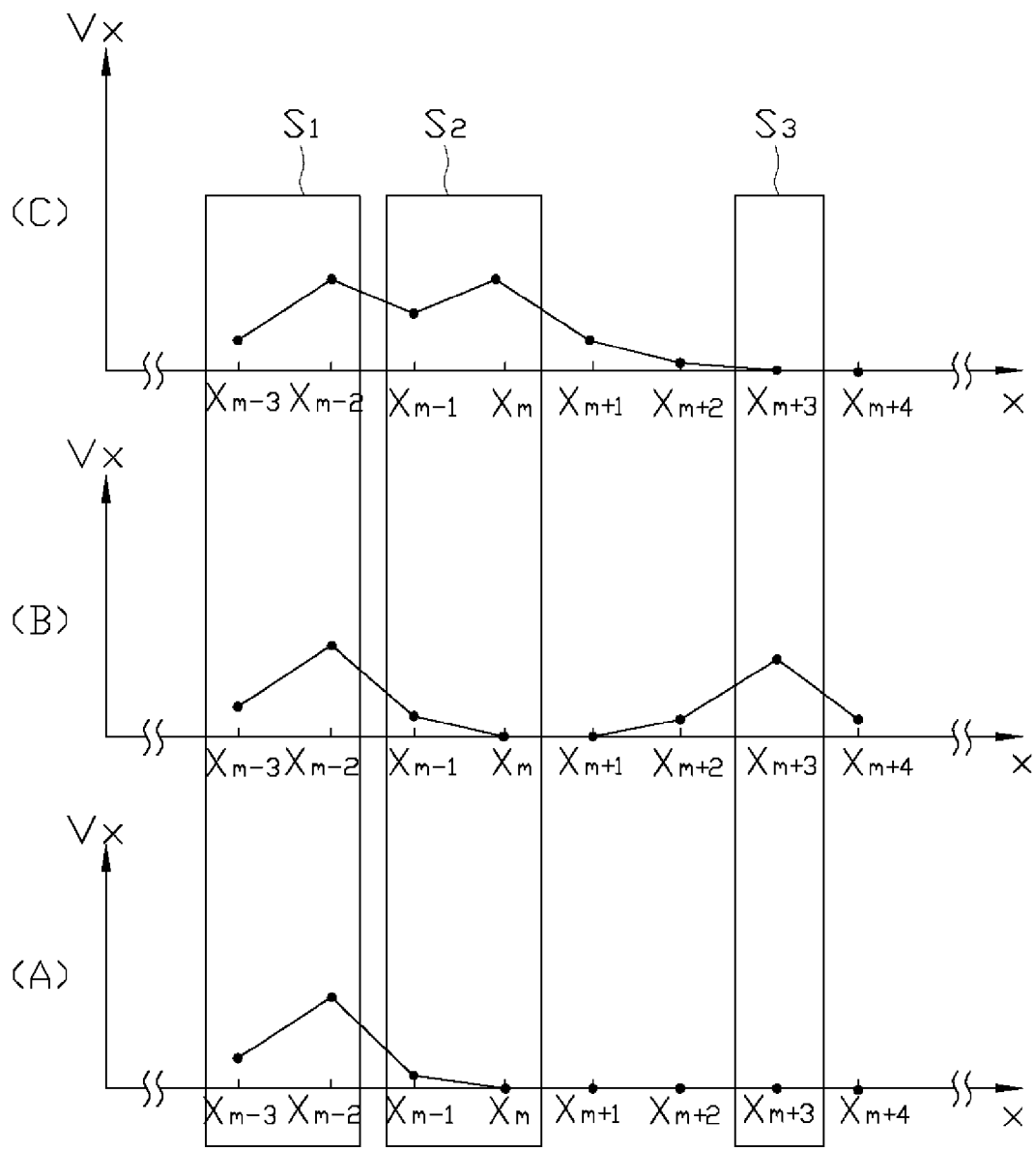
FIG. 7 is a plot of voltages measured at measuring points of the first conductive film of the touch panel in response to the five-point touch according to the first exemplary embodiment of a multi-touch detecting method of the present disclosure.

After the application of the first voltage to the sides of the first conductive film 113 through the first and second electrodes 115, 114, respectively, the second voltage is first applied to the second measuring point with the location on the Y-axis of $Y_{n-3}$, which corresponds to the first one of the second regions ($D_1$), through the corresponding fourth electrode 124. The voltages measured at the first measuring points with locations $X_{m-3}$, $X_{m-2}$, $X_{m-1}$, $X_m$, and $X_{m+3}$ on the X-axis through the corresponding second electrodes 114 in response to the application of the second voltage are shown in FIG. 7(A). A local extreme voltage is measured at the first measuring point with the location $X_{m-2}$ on the X-axis, which means there is a touched point ($C_{11}$) located at the intersection of the regions ($S_1$, $D_1$), and there are two false points ($C_{12}$, $C_{13}$) located at the intersection of the regions ($S_2$, $D_1$) and the intersection of the regions ($S_3$, $D_1$), respectively. Hence, the location of the touched point ($C_{11}$) is determined to be ($x_1$, $y_1$). It is noted that, because the second voltage is greater than the first voltage in this embodiment, the local extreme voltage is a local maximal voltage. Alternatively, the second voltage can be smaller than the first voltage. As such, the local extreme voltage thus measured will be a local minimal voltage.

Next, the second voltage is applied to the second measuring points with the locations $Y_{n-1}$ and $Y_n$ on the Y-axis, which correspond to the second one of the second regions ($D_2$), through the corresponding fourth electrodes 124. The voltages measured at the first measuring points with locations $X_{m-3}$, $X_{m-2}$, $X_{m-1}$, $X_m$, and $X_{m+3}$ on the X-axis through the corresponding second electrodes 114 in response to the application of the second voltage are shown in FIG. 7(B). Two local extreme voltages are measured at the first measuring points with the locations $X_{m-2}$ and $X_{m+3}$ on the X-axis, respectively, which means there are two touched points ($C_{21}$, $C_{23}$) located at the intersection of the regions ($S_1$, $D_2$) and the intersection of the regions ($S_3$, $D_2$), respectively, and there is a false point ($C_{22}$) located at the intersection of the regions ($S_2$, $D_2$). Hence, the locations of the touched points ($C_{21}$, $C_{23}$) are determined to be ($x_1$, $y_2$) and ($x_3$, $y_2$), respectively.

Finally, the second voltage is applied to the second measuring points with the locations $Y_{n+2}$ and $Y_{n+3}$ on the Y-axis of, which correspond to the third one of the second regions ($D_3$), through the corresponding fourth electrodes 124. The voltages measured at the first measuring points with locations $X_{m-3}$, $X_{m-2}$, $X_{m-1}$, $X_m$, and $X_{m+3}$ on the X-axis through the corresponding second electrodes 114 in response to the application of the second voltage are shown in FIG. 7(C). Two local extreme voltages are measured at the first measuring points with the locations $X_{m-2}$ and $X_m$ on the X-axis, respectively, which means there are two touched points ($C_{31}$, $C_{32}$) located at the intersection of the regions of ($S_1$, $D_3$) and the intersection of the regions ($S_2$, $D_3$), respectively, and there is a false point ($C_{32}$) located at the intersection of the regions ($S_3$, $D_3$). Hence, the locations of the touched points ($C_{31}$, $C_{32}$) are determined to be ($x_1$, $y_3$) and ($x_2$, $y_3$), respectively.

Preferably, in the step of measuring voltages at the first measuring points in response to the application of the second voltage, the voltages are measured in such a manner that while each of the first measuring points is measured, the first voltage is applied to the rest of the first measuring points and to the second measuring points with the locations on the Y-axis adjacent to or overlapping the rest of the y-components. In this embodiment, the multi-touch detecting method further includes: providing the first or second voltage to at least one of the second measuring points located between two of the second measuring points with the locations on the Y-axis adjacent to or overlapping two adjacent ones of the y-components, respectively.

The second exemplary embodiment of a multi-touch detecting method of the present disclosure is adapted for detecting locations of touched points on the touch panel 100, and includes the following steps. There is the step of scanning the first measuring points and determining x-components of the first embodiment. There is the step of scanning the second measuring points and determining y-components of the first embodiment. There is the step of applying the first voltage of the first embodiment. The step (d) is the step of applying the second voltage to the second measuring point(s) corresponding to at least one of the second regions ($D_1$, $D_2$, $D_3$) through the corresponding fourth electrode 124, and measuring sequentially voltages at the first measuring points with the locations on the X-axis adjacent to or overlapping the x-components through the corresponding second electrodes 114, in response to the application of the second voltage. The step (e) after step (d) is step of simultaneously applying the second voltage to the second measuring point(s) corresponding to the aforesaid at least one of the second regions ($D_1$, $D_2$, $D_3$) in step (d), and to at least one of the second measuring points corresponding to another one of the second regions ($D_1$, $D_2$, $D_3$) through the corresponding fourth electrode 124, and measuring sequentially voltages at the first measuring points with the locations on the X-axis adjacent to or overlapping the x-components through the corresponding second electrodes 114, in response to the application of the second voltage. The step (f) is the step of outputting the aforesaid one of the y-components and one of the x-components, which corresponds to one of the first measuring points at which a local extreme voltage is measured in step (e), as the location of a corresponding one of the touched points when the voltages measured at the aforesaid one of the first measuring points in steps (e) and (d) are different. The locations of the rest of the touched points are determined in a similar manner as steps (d) to (f).

Figure 6:
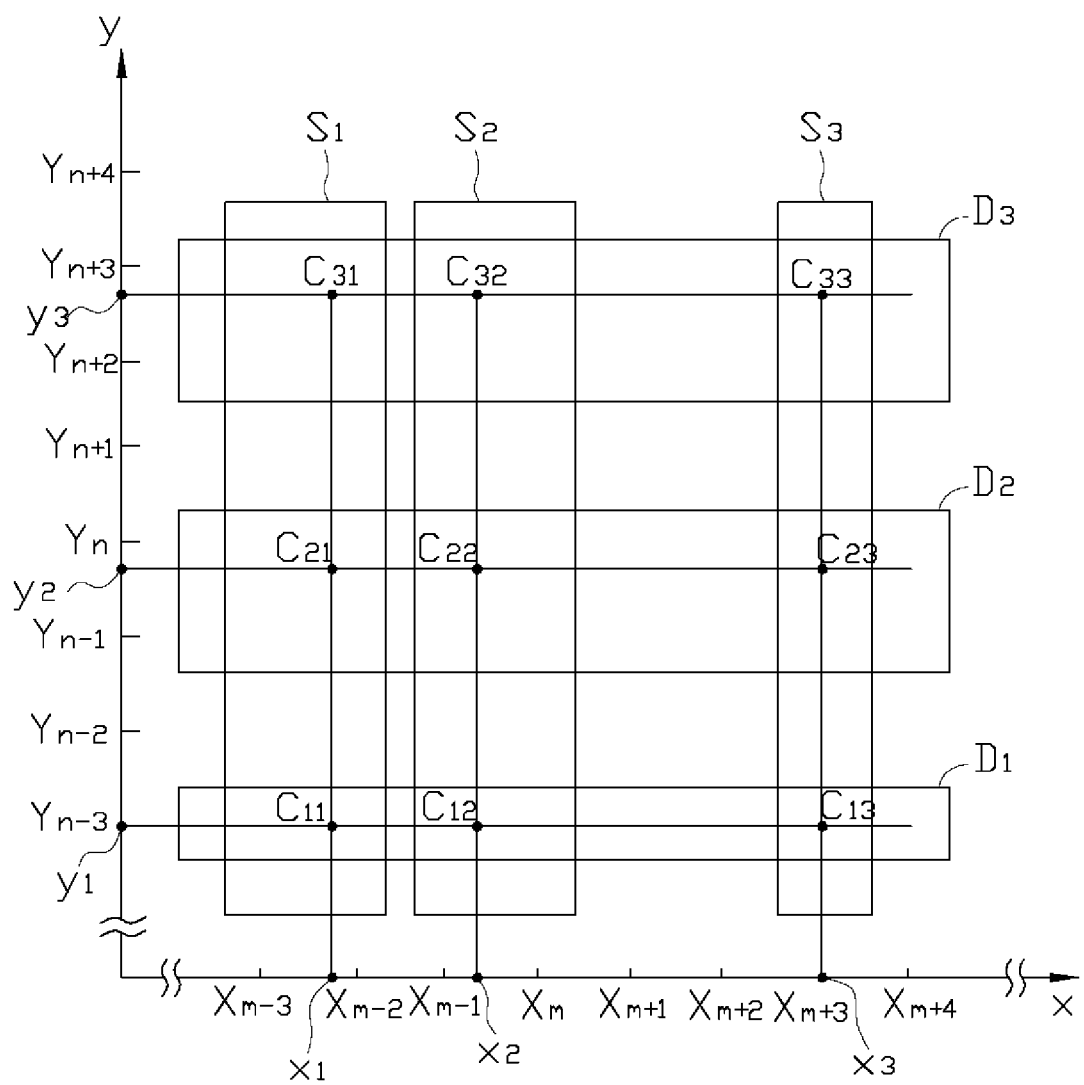
FIG. 6 is a schematic view of a five-point touch in which five points on the touch panel are touched.
Figure 8:
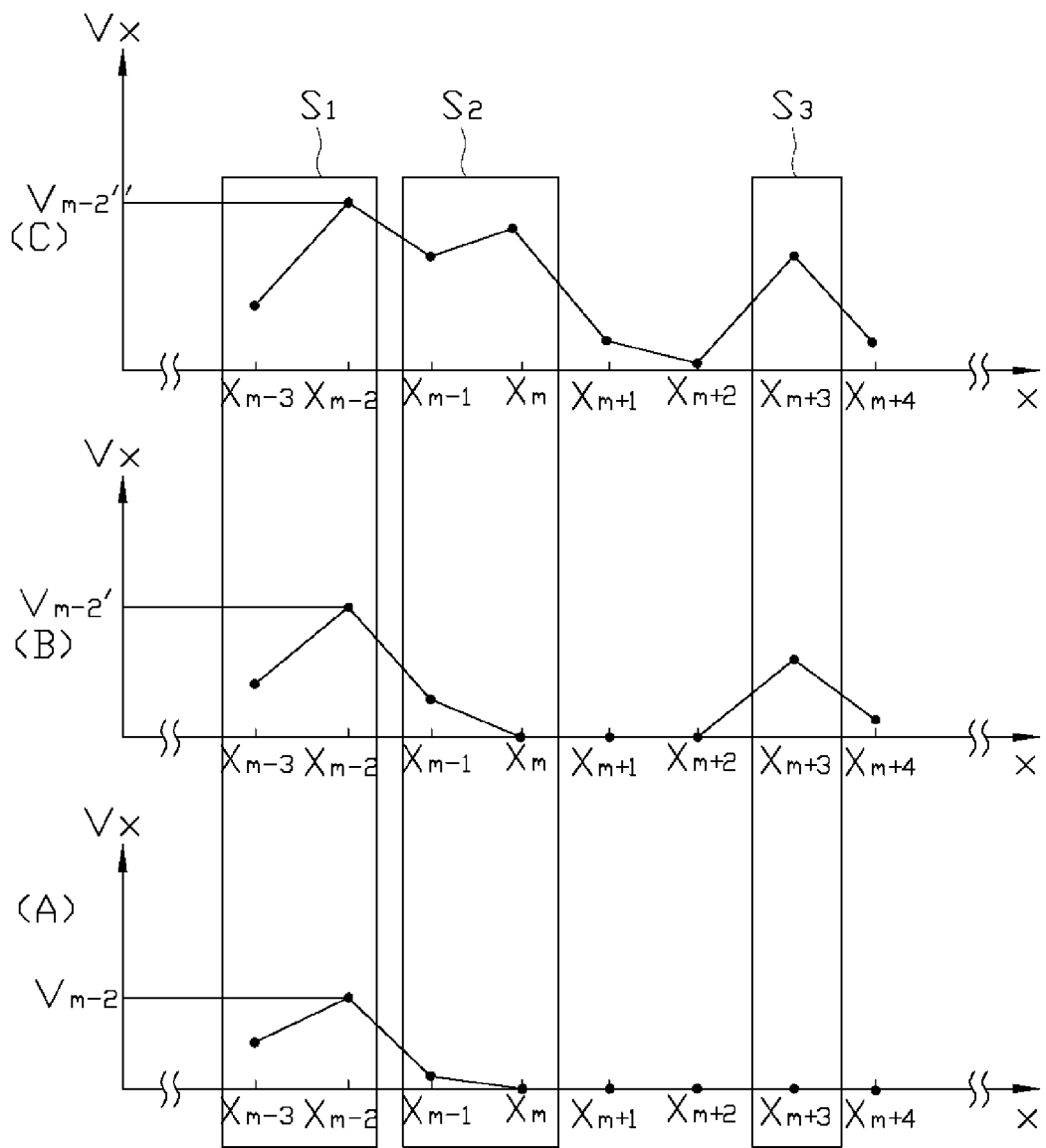
FIG. 8 is a plot of voltages measured at measuring points of the first conductive film of the touch panel in response to the five-point touch according to the second exemplary embodiment of a multi-touch detecting method of the present disclosure.

In more detail, referring to FIG. 6, in combination with FIG. 1, after the application of the first voltage to the sides of the first conductive film 113 through the first and second electrodes 115, 114, respectively, the second voltage is first applied to the second measuring point with the location $Y_{n-3}$ on the Y-axis, which corresponds to the first one of the second regions ($D_1$) through the corresponding fourth electrode 124 in step (d). The voltages measured at the first measuring points with locations $X_{m-3}$, $X_{m-2}$, $X_{m-1}$, $X_m$, and $X_{m+3}$ on the X-axis through the corresponding second electrodes 114 in response to the application of the second voltage are shown in FIG. 8(A). A local extreme voltage is measured at the first measuring point with the location $X_{m-2}$ on the X-axis, which means there is a touched points ($C_{11}$) located at the intersection of the regions ($S_1$, $D_1$), and there are two false points ($C_{12}$, $C_{13}$) located at the intersection of the regions ($S_2$, $D_1$) and the intersection of the regions ($S_3$, $D_1$), respectively. Hence, the location of the touched point ($C_{11}$) is determined to be ($x_1$, $y_1$).

Next, the second voltage is simultaneously applied to the second measuring point with the location $Y_{n-3}$ on the Y-axis and to the second measuring points with the locations $Y_{n-1}$ and $Y_n$ on the Y-axis, which correspond to the second one of the second regions ($D_2$), through the corresponding fourth electrodes 124 in step (e), i.e., the second regions ($D_1$, $D_2$) are applied with the second voltage at the same time. The voltages measured at the first measuring points with locations $X_{m-3}$, $X_{m-2}$, $X_{m-1}$, $X_m$, and $X_{m+3}$ on the X-axis through the corresponding second electrodes 114 in response to the appli-cation of the second voltage are shown in FIG. 8(B). Two local extreme voltages are measured at the first measuring points with the locations $X_{m-2}$ and $X_{m+3}$ on the X-axis, respectively. The voltages measured at the first measuring point with the location $X_{m-2}$ on the X-axis in step (e) (see FIG. 8(B)) and step (d) (see FIG. 8(A)) are different, and the voltages measured at the first measuring point with the location $X_{m+3}$ on the X-axis in step (e) (see FIG. 8(B)) and step (d) (see FIG. 8(A)) are different, which means there are two touched points ($C_{2i}$, $C_{23}$) located at the intersection of the regions ($S_1$, $D_2$) and the intersection of the regions ($S_3$, $D_2$), respectively, and there is a false point ($C_{22}$) located at the intersection of the regions ($S_2$, $D_2$). Hence, the locations of the touched points ($C_{21}$, $C_{23}$) are determined to be ($x_1$, $y_2$) and ($x_3$, $y_2$), respectively.

Finally, the second voltage is simultaneously applied to the second measuring point with the location $Y_{n-3}$ on the Y-axis, to the second measuring points with the locations $Y_{n-1}$ and $Y_n$ on the Y-axis, and to the second measuring points with the locations $Y_{n+2}$ and $Y_{n+3}$ on the Y-axis, which correspond to the third one of the second regions ($D_3$), through the corresponding fourth electrodes 124 in step (e), i.e., all the second regions ($D_1$, $D_2$, $D_3$) are applied with the second voltage at the same time. The voltages measured at the first measuring points with locations $X_{m-3}$, $X_{m-2}$, $X_{m-1}$, $X_m$, and $X_{m+3}$ on the X-axis through the corresponding second electrodes 114 in response to the application of the second voltage are shown in FIG. 8(C). Three local extreme voltages are measured at the first measuring points with the locations $X_{m-2}$, $X_m$ and $X_{m+3}$ on the X-axis. The voltages measured at the first measuring point with the location $X_{m-2}$ on the X-axis in step (e) (see FIG. 8(C)) and step (d) (see FIG. 8(B)) are different, the voltages measured at the first measuring point with the location $X_m$ on the X-axis in step (e) (see FIG. 8(C)) and step (d) (see FIG. 8(B)) are different, and the voltages measured at the first measuring point with the location $X_{m+3}$ on the X-axis in step (e) (see FIG. 8(C)) and step (d) (see FIG. 8(B)) are substantially the same, which means there are two touched points ($C_{31}$, $C_{32}$) located at the intersection of the regions ($S_1$, $D_3$) and the intersection of the regions ($S_2$, $D_3$), respectively, and there is a false point ($C_{33}$) located at the intersection of the regions ($S_3$, $D_3$). Hence, the locations of the touched points ($C_{31}$, $C_{32}$) are determined to be ($x_1$, $y_3$) and ($x_2$, $y_3$), respectively.

Preferably, in steps (d) and (e), the voltages are measured in such a manner that while each of the first measuring points is measured, the first voltage is applied to the rest of the first measuring points and to the second measuring points with the locations on the Y-axis adjacent to or overlapping the rest of the y-components. In this embodiment, the multi-touch detecting method further includes: (g) providing the first or second voltage to at least one of the second measuring points located between two of the second measuring points with the locations on the Y-axis adjacent to or overlapping two adjacent ones of the y-components, respectively.

As described above, the locations of the touched points can be thus determined. Exemplary functions provided by the embodiments of the multi-touch detecting method are described below.

Figure 9:
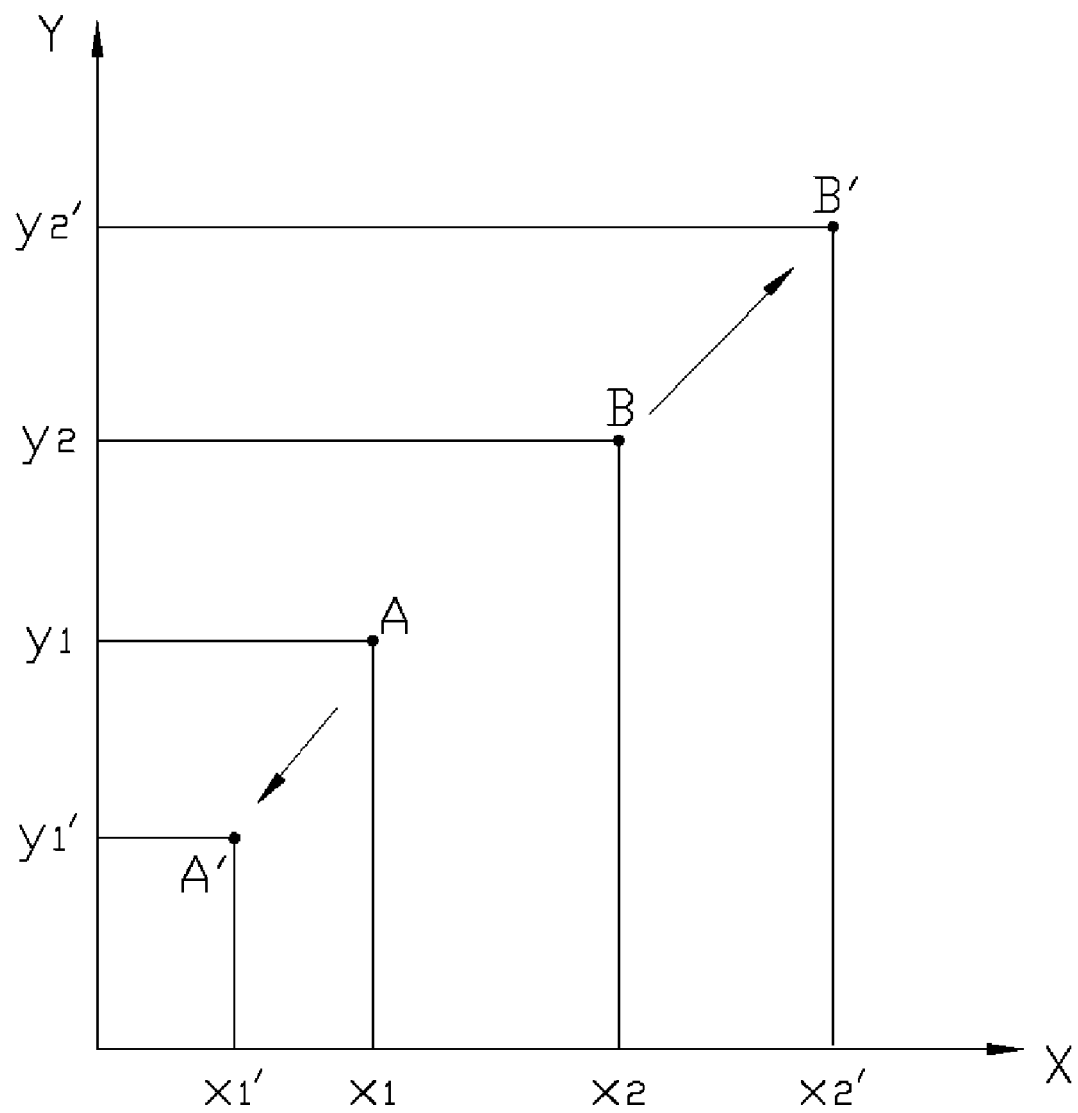
FIGS. 9 to 11 are schematic views to demonstrate that the exemplary embodiments of the multi-touch detecting method of the present disclosure are capable of supporting different multi-touch functions implemented in the touch panel.

FIG. 9 shows "zoom-in" and "zoom-out" functions provided by the embodiments of the multi-touch detecting method with two two-point touches on the touch panel 100 executed sequentially at a scanning interval. In the first two-point touch, the locations of the touched points (A, B) on the touch panel are determined to be ($x_1$, $y_1$) and ($x_2$, $y_2$), respectively, with a first distance therebetween. In the second two-point touch, the locations of the touched points (A', B') on the touch panel are determined to be $(x_1', y_1')$ and $(x_2', y_2')$, respectively, with a second distance therebetween greater than the first distance. As such, the "zoom-in" function can be triggered by first executing the first two-point touch and then the second two-point touch, and the "zoom-out" function can be triggered by first executing the second two-point touch and then the second two-point touch.

Figure 10:
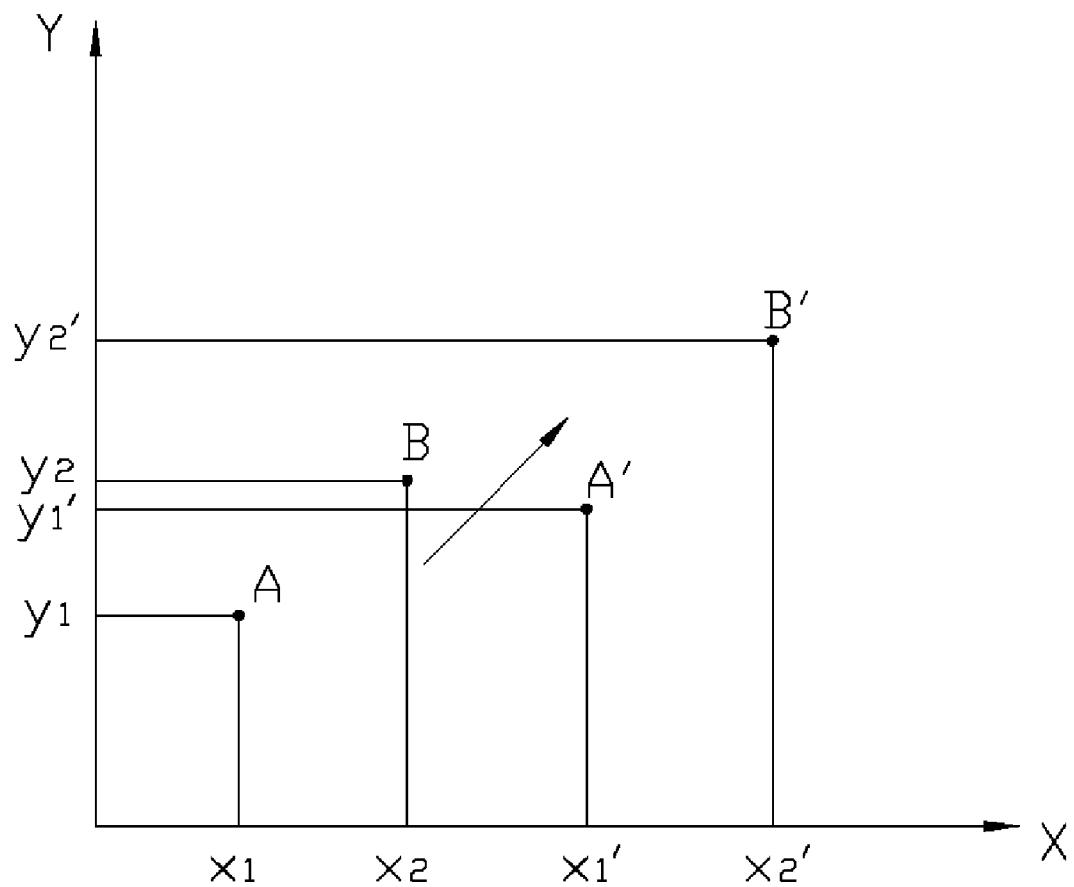

FIG. 10 shows a "translation" function provided by the embodiments of the multi-touch detecting method with two two-point touches on the touch panel executed sequentially at a scanning interval. In the first two-point touch, the locations of the touched points (A, B) on the touch panel are determined to be $(x_1, y_1)$ and $(x_2, y_2)$, respectively. In the second two-point touch, the locations of the touched points (A', B') on the touch panel 100 are determined to be $(x_1', y_1')$ and $(x_2', y_2')$, respectively, with the movement from A to A' being substantially the same as the movement from B to B'. As such, the "translation" function can be triggered by executing the first and second two-point touches sequentially.

Figure 11:
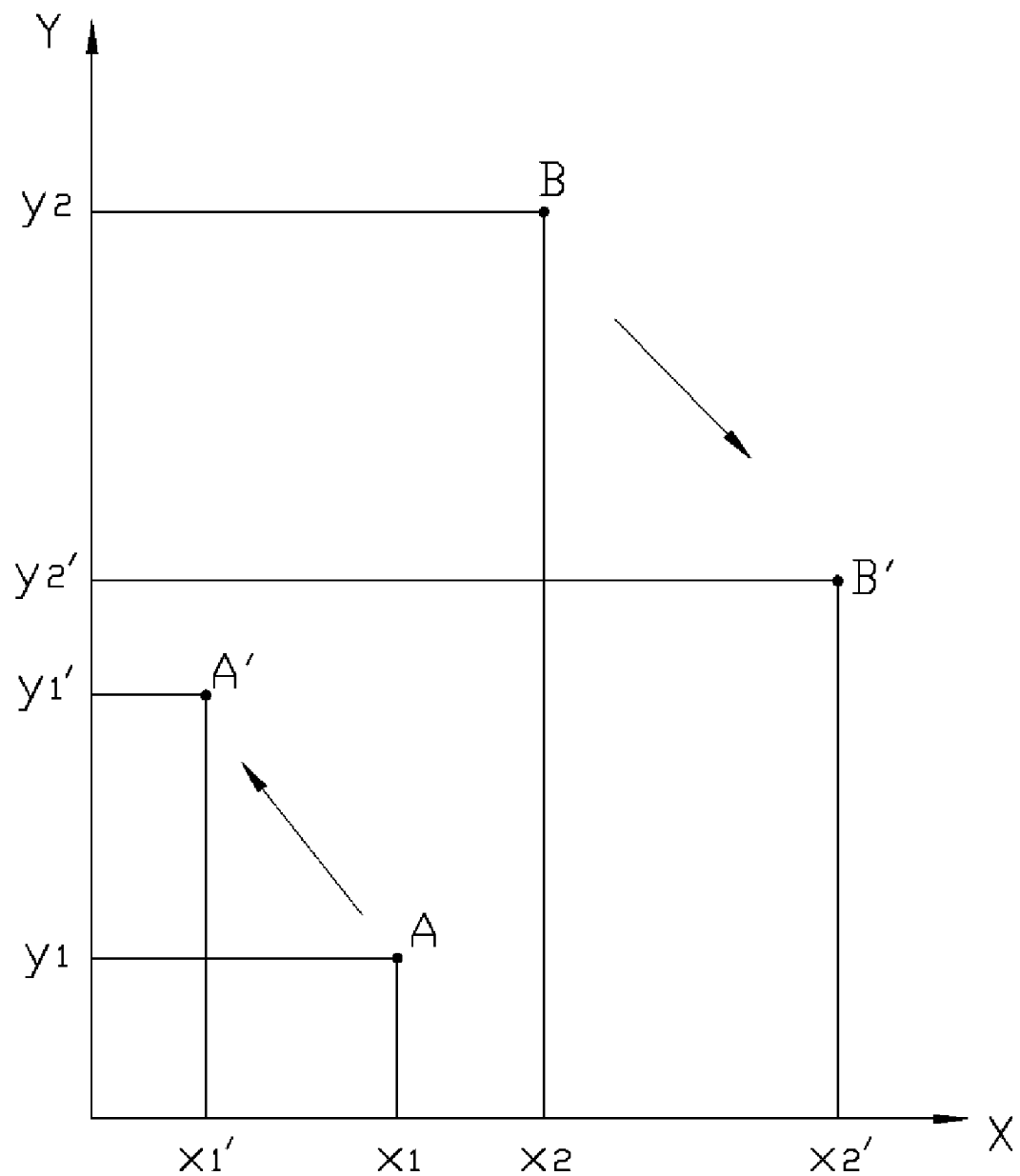

FIG. 11 shows a "rotation" function provided by the embodiment of the multi-touch detecting method with two two-point touches on the touch panel executed sequentially at a scanning interval. In the first two-point touch, the locations of the touched points (A, B) on the touch panel are determined to be $(x_1, y_1)$ and $(x_2, y_2)$, respectively. In the second two-point touch, the locations of the touched points (A', B') on the touch panel 100 are determined to be $(x_1', y_1')$ and $(x_2', y_2')$, respectively, with the rotation from A to A' and the rotation from B to B' being in the same direction, i.e., a clockwise direction or a counterclockwise direction. As such, the "rotation" function can be triggered by executing the first and second two-point touches sequentially.

In summary, with the use of the first and second conductive films 113, 123 exhibiting electrical anisotropy, the structure of the touch panel 100 is simple and the multi-touch detecting method implemented by the touch panel 100 is simple.

It is to be understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed.

What is claimed is:

1. A multi-touch detecting method adapted for detecting locations of touched points on a touch panel, the touch panel including first and second conductive films insulated from each other and coupled electrically to each other through touch, the multi-touch detecting method comprising:

scanning first measuring points of the first conductive film distributed along X-axis of a Cartesian plane of the touch panel, and determining x-components of the touched points, based on the response of the first measuring points;

scanning second measuring points of the second conductive film distributed along Y-axis of the Cartesian plane of the touch panel, and determining y-components of the touched points, based on the response of the second measuring points;

applying a first voltage to the first conductive film; and applying a second voltage different from the first voltage to at least one of the second measuring points with the location on the Y-axis adjacent to or overlapping one of the y-components, measuring sequentially voltages at the first measuring points with the locations on the X-axis adjacent to or overlapping the x-components, in response to the application of the second voltage, and outputting the one of the y-components and one of the x-components, which corresponds to one of the first measuring points at which a local extreme voltage is measured, as the location of a corresponding one of the touched points.

2. The multi-touch detecting method of claim 1, wherein the voltages are measured in such a manner that while each of the first measuring points is measured, the first voltage is applied to the rest of the first measuring points.

3. The multi-touch detecting method of claim 1, further comprising providing the first voltage to at least one of the second measuring points located between two of the second measuring points with the locations on the Y-axis adjacent to or overlapping two adjacent ones of the y-components, respectively.

4. The multi-touch detecting method of claim 1, wherein the second voltage is greater than the first voltage, the local extreme voltage being a local maximal voltage.

5. The multi-touch detecting method of claim 1, wherein the second voltage is smaller than the first voltage, the local extreme voltage being a local minimal voltage.

6. A multi-touch detecting method adapted for detecting locations of touched points on a touch panel, the touch panel including first and second conductive films insulated from each other and coupled electrically to each other through touch, the multi-touch detecting method comprising:

(a) scanning first measuring points of the first conductive film distributed along X-axis of a Cartesian plane of the touch panel, and determining x-components, which correspond to the locations of the touched points, based on the response of the first measuring points;

(b) scanning second measuring points of the second conductive film distributed along Y-axis of the Cartesian plane of the touch panel, and determining y-components, which correspond to the locations of the touched points, based on the response of the second measuring points;

(c) applying a first voltage to the first conductive film;

(d) applying a second voltage different from the first voltage to at least one of the second measuring points with the location on the Y-axis adjacent to or overlapping one of the y-components, and measuring sequentially voltages at the first measuring points with the locations on the X-axis adjacent to or overlapping the x-components, in response to the application of the second voltage;

(e) simultaneously applying the second voltage to the at least one of the second measuring points with the location on the Y-axis adjacent to or overlapping the one of the y-components in step (d), and to at least one of the second measuring points with the location on the Y-axis adjacent to or overlapping another one of the y-components, and measuring sequentially voltages at the first measuring points with the locations on the X-axis adjacent to or overlapping the x-components, in response to the application of the second voltage; and (f) outputting the one of the y-components and one of the x-components, which corresponds to one of the first measuring points at which a local extreme voltage is measured in step (e), as the location of a corresponding one of the touched points when the voltages measured at the one of the first measuring points in steps (d) and (e) are different.

7. The multi-touch detecting method of claim 6, wherein in steps (d) and (e), the voltages are measured in such a manner that while each of the first measuring points is measured, the first voltage is applied to the rest of the first measuring points.

8. The multi-touch detecting method of claim 6, further comprising: providing the first voltage to at least one of the second measuring points located between two of the second measuring points with the locations on the Y-axis adjacent to or overlapping two adjacent ones of the y-components, respectively.

9. The multi-touch detecting method of claim 6, wherein the second voltage is greater than the first voltage, in step (f), the local extreme voltage being a local maximal voltage.

10. The multi-touch detecting method of claim 6, wherein the second voltage is smaller than the first voltage, in step (f), the local extreme voltage being a local minimal voltage.

11. A multi-touch detecting method adapted for detecting locations of touched points on a touch panel, the touch panel including first and second conductive films insulated from each other, the first conductive film having a plurality of first measuring points distributed along X-axis of a Cartesian plane of the touch panel, the second conductive film having a plurality of second measuring points distributed along Y-axis of the Cartesian plane of the touch panel, the multi-touch detecting method comprising:

applying a first voltage to the first conductive film;
applying a second voltage different from the first voltage to one of the second measuring points;
measuring sequentially voltages at the first measuring points in response to the application of the second voltage; and
outputting a location based on the one of the second measuring points and one of the first measuring points at which a local extreme voltage is measured.

12. The multi-touch detecting method of claim 11, wherein the voltages are measured in such a manner that while each of the first measuring points is measured, the first voltage is applied to the rest of the first measuring points.

13. The multi-touch detecting method of claim 11, wherein the second voltage is greater than the first voltage, the local extreme voltage being a local maximal voltage.

14. The multi-touch detecting method of claim 11, wherein the second voltage is smaller than the first voltage, the local extreme voltage being a local minimal voltage.

15. A multi-touch detecting method adapted for detecting locations of touched points on a touch panel, the touch panel including first and second conductive films insulated from each other the first conductive film having a plurality of first measuring points distributed along X-axis of a Cartesian plane, the second conductive film having a plurality of second measuring points distributed along Y-axis of the Cartesian plane, the multi-touch detecting method comprising:

(a) applying a first voltage to the first conductive film;
(b) applying a second voltage different from the first voltage to one of the second measuring points, and measuring sequentially voltages at the first measuring points in response to the application of the second voltage;
(c) simultaneously applying the second voltage to the one of the second measuring points in step (b) and to another one of the second measuring points, and measuring sequentially voltages at the first measuring points in response to the application of the second voltage; and
(d) outputting a location based on the another one of the second measuring points and one of the first measuring points at which a local extreme voltage is measured in step (c) when the voltages measured at the one of the first measuring points in steps (b) and (c) are different.

\* \* \* \* \*